United States Patent Office 3,451,281
Patented June 24, 1969

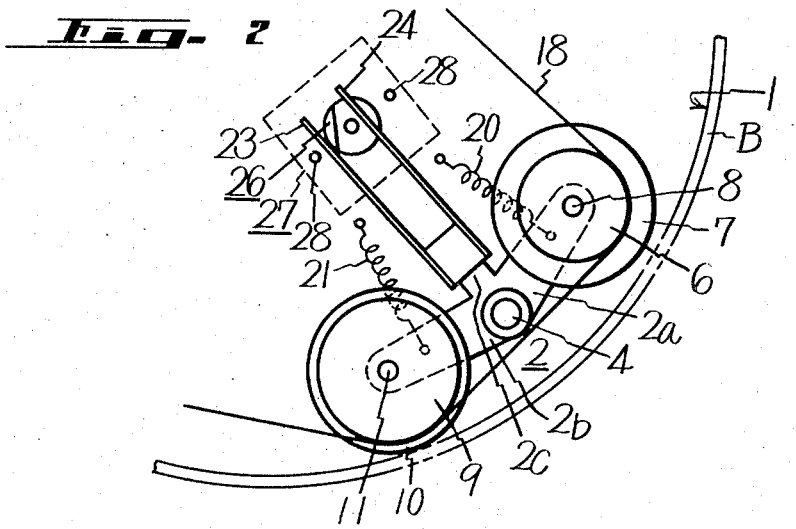
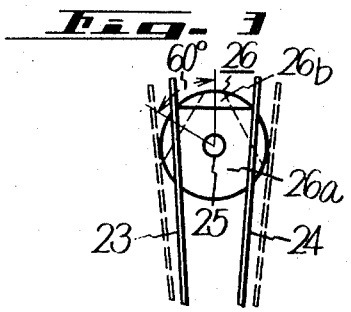
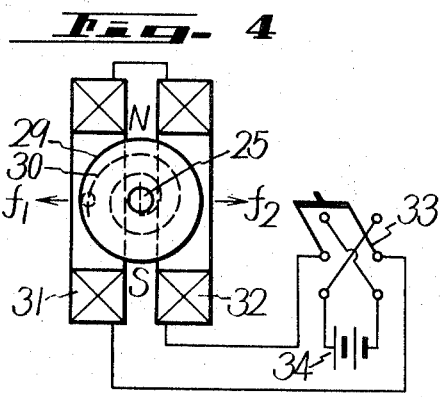
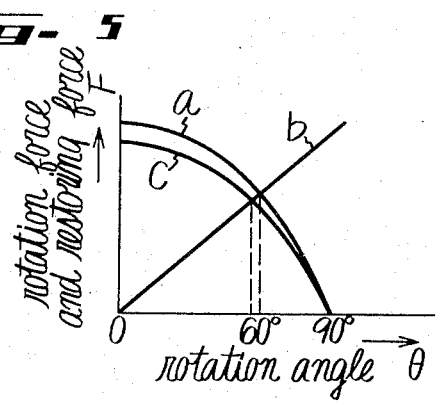

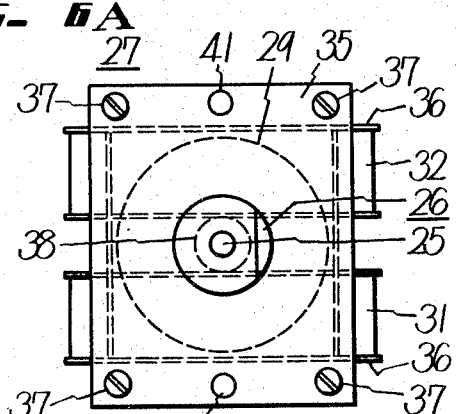
Fig-6A
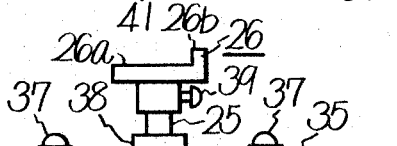
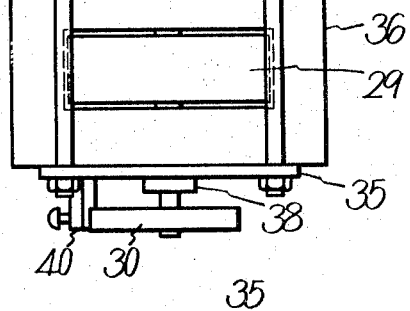
Fig-6B
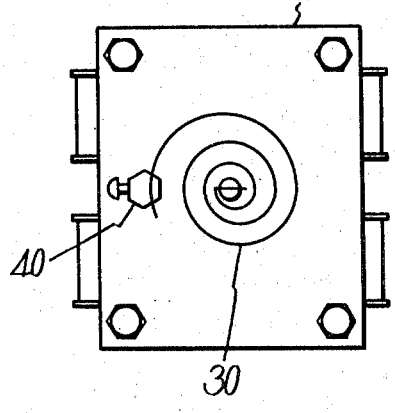
Fig-6C

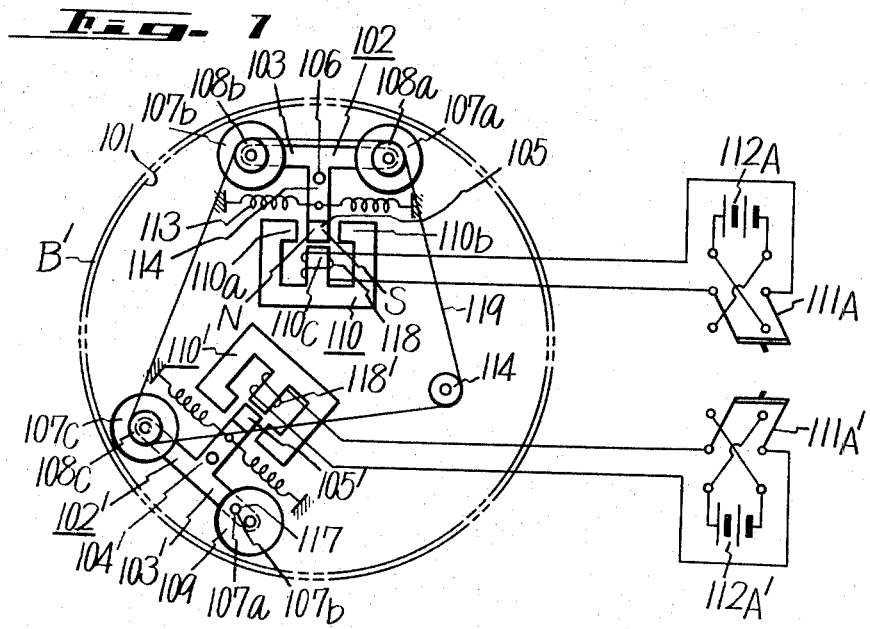
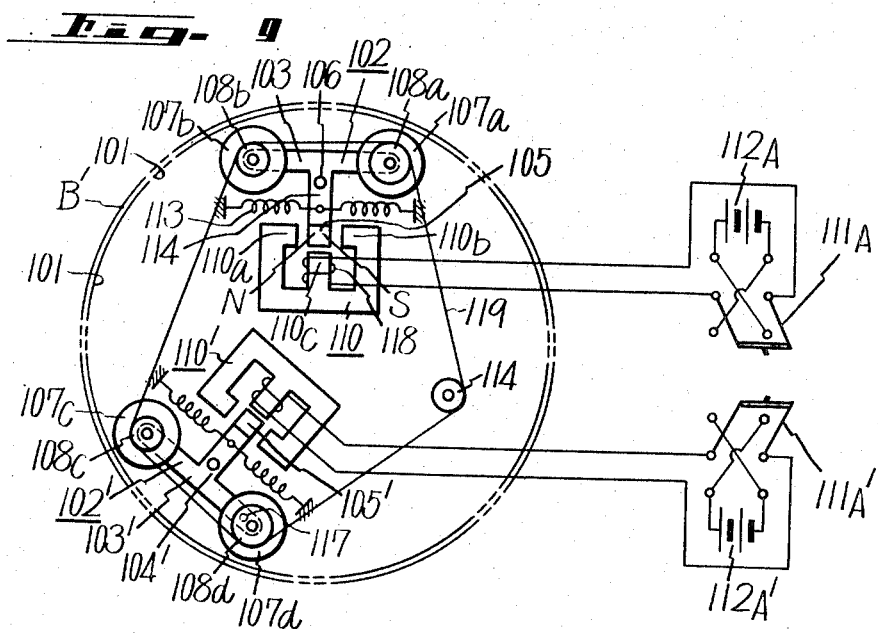

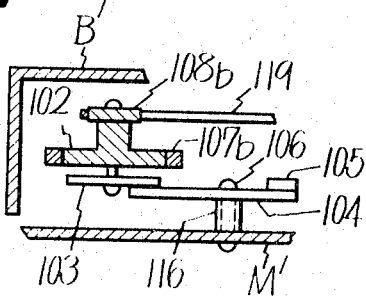
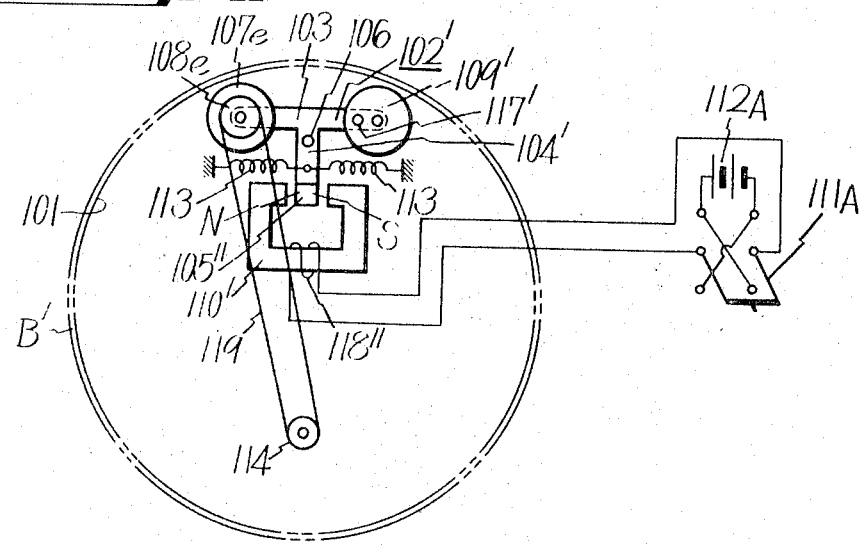

3,451,281
TURNTABLE DRIVING APPARATUS
Hitoshi Matsuda, Tokyo, Japan, assignor to Nippon Columbia Kabushikikaisha (Nippon Columbia Co., Ltd.), Tokyo, Japan, a corporation of Japan
Filed Apr. 4, 1967, Ser. No. 628,391
Claims priority, application Japan, Apr. 12, 1966 (utility model), 41/33,246; Aug. 23, 1966, (utility model), 41/79,606
Int. Cl. F16h 15/00
U.S. Cl. 74—190         8 Claims

ABSTRACT OF THE DISCLOSURE

A turntable driving apparatus having a plurality of sets of pulleys and idlers rotated by a common driving shaft through a common belt, a brake and means for selectively engaging one of the idlers with a turntable so as to rotate it at a desired speed or stop its rotation.

BACKGROUND OF THE INVENTION

Field of the invention

The present invention relates to a turntable driving apparatus including a plurality of idlers and pulleys each rotated at a predetermined speed by a common driving shaft and means for engaging one of the idlers or brakes with the turntable so as to rotate it at a desired speed.

Description of the prior art

A turntable driving apparatus heretofore used has a rotating shaft having provided thereon pulleys or idlers of different radiuses for rotating the turntable at different speeds and complicated means for engaging one of the pulleys or the idlers with the turntable. Such an apparatus inevitably produces considerable amount of shock when the rotating shaft engages with the turntable and also the pressure exerted on the turntable by the rotating shaft varies due to the complicated means.

SUMMARY OF THE INVENTION

The present invention relates to a turntable driving apparatus having a turntable, a drive shaft driven by a motor, a plurality of sets of idlers or brakes and pulleys each affixed to each of a plurality of shafts, a plurality of support members for supporting said plurality of shafts, said plurality of support members being journalled on a stationary part, a common belt trained around said drive shaft and all of said pulleys for driving them and means for selectively engaging one of said plurality of idlers or brake with said turntable, by which each of idlers or brake can be smoothly engaged with the turntable without changing the contact pressure between the idler or brake and the turntable and the means for engaging the idler or brake with the turntable can be simplified in construction and also starting and stopping of the turntable can be attained positively and easily.

BRIEF DESCRIPTION OF THE DRAWING

FIGURE 2 is a partial plan view of the device depicted in FIGURE 1, showing the state in which the turntable is driven;

FIGURE 3 is an enlarged plan view of one part of the device shown in FIGURE 1, especially a cam used in this invention;

FIGURE 4 is a plan view showing the principle of a cam actuator to be employed in the device of this invention;

FIGURE 5 is a graph for explaining the operation of side and bottom views of the cam actuator illustrated in FIGURE 4;

FIGURES 6A to 6C, inclusive, are respectively top, the cam actuator depicted in FIGURE 4;

FIGURE 7 is a plan view illustrating another example of the turntable driving device of this invention;

FIGURE 8 is a side view, partly in cross-section, showing the principal part of the turntable driving device shown in FIGURE 7;

FIGURE 9 is a plan view illustrating still another example of the turntable driving device of this invention; and FIGURE 10 is a plan view showing a still further example of the turntable driving device of this invention.

DESCRIPTION OF PREFERRED EMBODIMENTS

Figure 1:
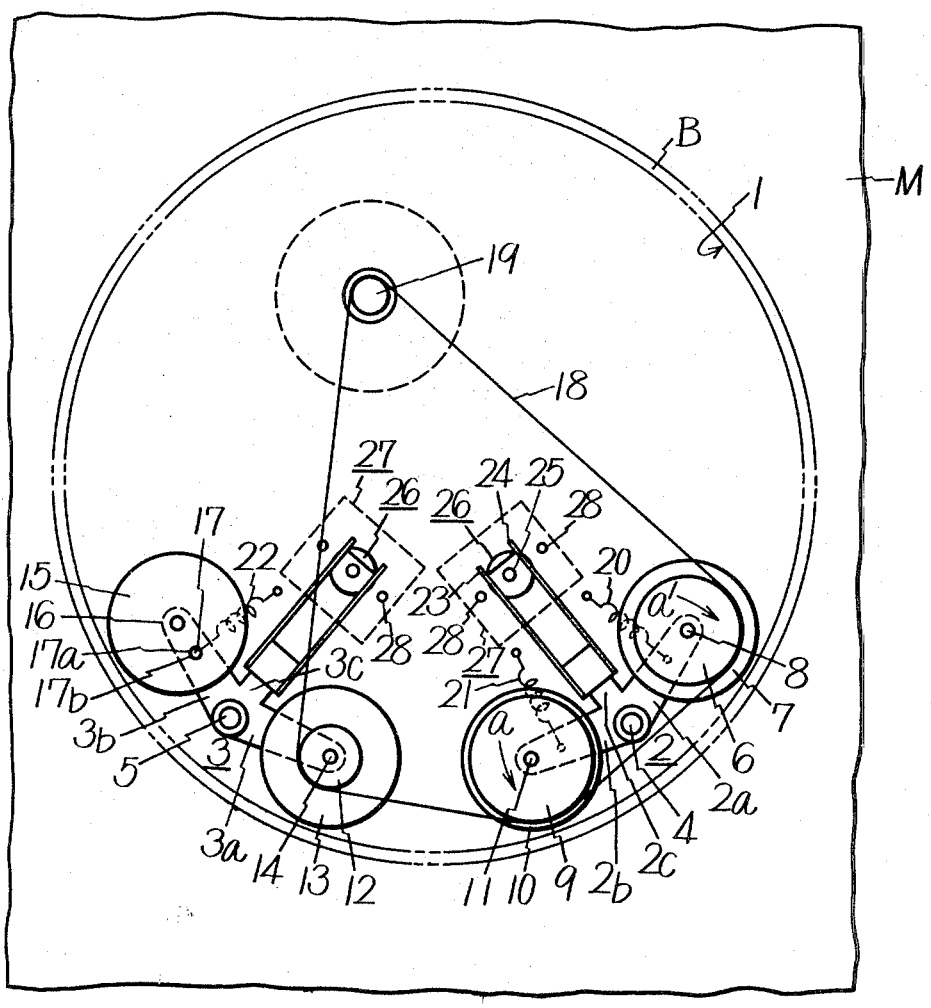
FIGURE 1 is a plan view schematically illustrating one example of a turntable driving device of this invention.

In FIGURE 1 there is illustrated one embodiment of the turntable driving apparatus of this invention employing three idlers for driving a turntable at three different speeds such, for example, as 33, 45 and 78 r.p.m. and one brake. In the figure, reference numeral 1 indicates the inner wall of a turntable B, 2 and 3 substantially T-shaped idler or brake supports respectively consisting of arms 2a, 2b, 2c and 3a, 3b, 3c. The idler supports 2 and 3 are pivotally journalled to a motor board M by shafts 4 and 5 at their substantially central points respectively. The arm 2a of the idler support 2 has piovted to the free end thereof, for example, a 45 r.p.m. pulley 6 and an idler 7 by a common shaft 8 in such a manner as to be concentric with each other and rotatable as one body. In a similar manner, the free end of the arm 2b has pivoted thereto, for instance, a 33 r.p.m. pulley 9 and an idler 10 by a common shaft 11 and the free end of the arm 3a of the other idler or brake support 3 has also pivoted thereto, for example, a 78 r.p.m. pulley 12 and an idler 13 by a common shaft 14. Further, the free end of the arm 3b has journalled thereto, for instance, a brake 15 by a shaft 16, but this brake 15 is used for stopping the turntable and hence is fixed to the arm 3b by a pin 17 which passes through pin holes 17a and 17b respectively provided on the arm 3b and the brake 15. The three pulleys 6, 9 and 12 and a common drive shaft 19 are interconnected by a common belt 18 so that the three pulleys are driven with the rotation of the drive shaft 19 at the same time. In the illustrated example the idlers 7, 10, 13 and brake 15 have the same diameter, while the diameters of the pulleys 6, 9 and 12 are all different, each depending upon the revolution number of a motor, the diameter of the drive shaft and the revolution number of the pulley. As above described, the pulleys 6, 9 and 12 and the idlers 7, 10, 13 and brake 15 are supported by the rotatable idler supports 2 and 3 and the pulleys 6, 9 and 12 are coupled with the drive shaft 19 by the belt 18. In this case, tension exerted on the pulleys by the belt 18 differs respectively depending upon the relative arrangement of the pulleys, the difference in the diameter thereof and so on, so that unnecessary rotational force is applied to the idler supports 2 and 3. To avoid this, springs 20, 21 and 22 are stretched between the arms 2a, 2b, 3b and the motor board M by which the distance between each idler or brake and the inner wall 1 of the turntable B is held equal under the inoperative condition of the turntable.

When the motor rotates the pulleys 6, 9 and 12 are revolved by the belt 18 and either one of the idler or brake supports 2 and 3 is selectively turned to press one idler or brake against the inner wall 1 of the turntable, thus driving it. For this purpose, means for rotating the respective idler supports 2 and 3 are provided in connection with the idler support.

A description will be given in connection with the means for rotating the idler supports.

To both sides of the free end portion of the arm 2c of the idler support 2, a pair of plate springs 23 and 24 are secured which extend in a direction opposite from the shaft 4. A cam 26 consisting of a disc 26a and an arc-shaped cam projection 26b protruded from the disc 26a is disposed in such a manner that the both ends of the cam projection 26b contact with both of the inner surfaces of the plate springs 23 and 24 in inoperative condition. In this case, the disc 26a and hence the cam projection 26b are attached to a rotary shaft 25 disposed between the free ends of the plate springs 23 and 24. The shaft 25 serves as a rotary shaft of a cam actuator for rotating the cam 26, as will be described later on. Reference numeral 27 designates a cam actuator disposed on the underside of the motor board M and secured thereto by screws 28, as indicated by the broken line. The relationship between the plate springs 23 and 24 and the cam 26 is as illustrated in FIGURE 3 and the distance between both ends of the arc-shaped cam projection 26b is selected equal to that between the plate springs 23 and 24. When the arc-shaped cam projection 26b of the cam 26 assumes such a position as indicated by the full line in the figure, the idler or brake support does not turn. That is, the arc-shaped cam projection 26b is merely in contact with both of the plate springs 23 and 24 at both ends without applying any force thereto, and hence the idler or brake support does not turn. Where the cam 26 rotates about the shaft 25 and assumes either position indicated by the broken lines in the figures the plate springs are each pushed outwardly of their normal position by the arc-shaped cam projections 26b. As a result of this, the idler support 2 having attached thereto the plate springs 23 and 24 is turned about the rotary shaft 4 in a direction indicated by, for example, the arrow $a$ or $a'$ as illustrated in FIGURE 1, thereby pressing the 33 r.p.m. idler 10 or the 45 r.p.m. idler 7 against the inner wall 1 of the turntable B, as shown in FIGURE 2. Thus, the turntable is driven at 33 r.p.m. or at 45 r.p.m. In this case, the displacement of the plate springs by the rotation of the arc-shaped cam projection 26b of the cam 26 reaches its maximum value when the arc-shaped cam projection 26b rotates 45° from the position indicated in full line, and then the displacement remains unchanged until when the rotational angle reaches 135°.

In the present invention the cam 26 is turned on until the displacement of the plate spring reaches the maximum value and the relative arrangement of the components is selected such that the force for pressing the idler or brake against the turntable becomes appropriate when the displacement reaches the maximum value.

Referring now to FIGURES 4 and 5, a description will be given in connection with the principle of the cam actuator 27 for rotating the cam plate 26. Reference numeral 25 identifies a shaft to which the cam plate 26 is affixed, and 29 a rotary ferrite magnet affixed to the shaft 25 and magnetized N and S as illustrated in FIGURE 4. Reference numeral 30 indicates a coiled spring one end of which is secured to the lower portion of the shaft 25 and the other end of which is fixed to the base plate of the cam actuator. Reference numerals 31 and 32 designate coils each wound in such a sense as to produce a magnetic flux in a direction vertical to the magnetizing direction of the rotary ferrite magnet 29, as indicated at $f_1$ and $f_2$ in FIGURE 4, and their terminals are connected to a DC power source 34 through a polarity changeover switch 33. Upon application of a current to the coils 31 and 32 from the DC power source 34, magnetic fluxes are produced in a direction vertical to the magnetizing direction of the rotary ferrite magnet 29 so that the rotary ferrite magnet 29 rotates only 90° and stops at such a position that the direction of the magnetic fluxes agrees with that of the magnetization of the rotary ferrite magnet 29. The relationship between the rotating force F of the rotary ferrite magnet due to the energization of the coils and the rotational angle $\theta$ thereof is as indicated by the curve $a$ in FIGURE 5, the ordinate representing the former and the abscissa the latter. As is apparent from FIGURE 5, the rotating force F is maximum with the rotational angle $\theta$ being zero and is zero with the latter being 90°. In practice, when the shaft 25 rotates a restoring force indicated by $c$ in FIGURE 5 of the coiled spring 30 is exerted upon the rotary ferrite magnet 29 to stop it at such a position that the rotating force F and the restoring force of the coiled spring 30 are in equilibrium.

In this invention the restoring force of the coiled spring 30 indicated by the curve $b$ in FIGURE 5 and the rotating force F of the rotary ferrite magnet 29 indicated by the curve $a$ are so set as to be in equilibrium where the rotary ferrite magnet 29 would have rotated approximately 60°. Then, the switch 33 is opened to cut off the power source 34, by which the rotary ferrite magnet 29 returns to its initial position shown in FIGURE 4 due to the restoring force of the coiled spring 30. Since the coils 31 and 32 of the cam actuator are connected to the DC power source 34 through the polarity change-over switch 33, changing-over of the switch 33 will reverse the direction of the current flowing through the coils 31 and 32. Accordingly, the cam 26 rotates in a reverse direction to bring the other idler 7 into contact with the inner wall of the turntable. In this case, the difference in the restoring force of the rotary ferrite magnet according to the turning direction of the coiled spring is substantially negligible because the rotational angle is less than 90°.

The curve $c$ in FIGURE 5 indicates the variations in the rotating force of the rotary ferrite magnet 29 caused by voltage drop of the DC power source 34, and in this case the angle at which the rotating force of the rotary ferrite magnet 29 and the restoring force of the coiled spring 30 are in equilibrium is less than 60°. However, the cam 26 rotating with the rotary ferrite magnet 29 has the arc-shaped cam projection 26b, so that slight variations in the rotational angle causes substantially no variation in the displacement of the plate springs, as previously described. Therefore, no influence is exerted on the force for pressing the idler or brake against the inner wall of the turntable. Further, it will be seen that slight rise of the power source voltage similarly exerts practically no influence upon the force for pressing the idler to the turntable. While, the foregoing has been given in connection with the rotating means for the idler support 2, it will be understood that the idler 13 and brake 15 can similarly be operated by the provision of similar rotating means in connection with support member 3.

FIGURES 6A to 6C illustrate, by way of example, the concrete structure of the cam actuator 27 of this invention, in which similar elements to the aforementioned ones are identified by the same reference numerals. Reference numeral 35 indicates base plates disposed upper and lower side thereof and made of, for example, iron which serve as magnetic paths for reducing magnetic resistance. Reference numeral 36 designates babbins for respectively having the coils 31 and 32 which are disposed between the upper and lower base plates 35 and these bobbins 36 are separated from each other for the shaft 25 of the rotary ferrite magnet 29 passes therebetween and protrudes outwardly of the upper and lower base plates 35. Reference numeral 37 identifies screws for securing the coil bobbins 36 to the base plates 35. Reference numeral 38 represents stoppers for the shaft 25 and the upper end of the shaft 25 has attached thereto the cam 26 by a screw 39. Reference numeral 36 designates bobbins for respectively having underside of the lower base plate 35, and the free end of the coiled spring 30 attached to the lower portion of the shaft 25 is fixed to the fixed piece 40. Reference numeral 41 indicates holes for securing the cam actuator 27 mounted on the upper base plate 35 to the motor board M.

According to the present invention described in the foregoing, the arc-shaped cam projection is electromagnetically rotated to push either one of the plate springs secured to the idler support and the idler support is thereby turned to bring a desired idler in contact with the inner wall of the turntable. Accordingly, substantially no shock is caused between the idler and the turntable when engaged with each other. Further, the variations in the power source voltage applied to the coils exert substantially no influence upon the force for pressing the idler to the turntable as set forth above, so that the turntable can efficiently be driven in practice.

FIGURE 7 illustrates a modified form of the turntable driving device of this invention, particularly a modification of the means for engaging a desired idler with the inner wall of the turntable. In the figure, reference numeral 101 indicates the inner wall of a turntable B', and 102 a support for idlers and pulleys, which is substantially T-shaped consisting of a first arm 103 and a second arm 104 extending centrally thereof approximately at right angles thereto. The arm 104 has mounted on the free end thereof a permanent magnet 105 magnetized in its widthwise direction and is rotatably pivoted at its intermediate portion by a shaft 106 to a motor board M' through a spacer 116, as depicted in FIGURE 8. Meanwhile, both free ends of the arm 103 have rotatably pivoted thereto idlers 107a and 107b, the idlers having pulleys 108a and 108b formed concentrically and integrally therewith. Further, a substantially E-shaped magnetic core 110 is disposed in the vicinity of the free end of the arm 104, with a pair of magnetic pole pieces 110a and 110b of the magnetic core 110 being in opposing relation to the permanent magnet 105. A center magnetic pole piece 110c of the E-shaped magnetic core 110 has wound thereon a coil 118 and both ends of the coil 118 are connected to a DC power source 112A through a polarity change-over switch 111A. Reference numeral 113 designates a pair of springs, by which the arm 104 is biased to lie midway between the magnetic pole pieces 110a and 110b when no current is fed to the coil 118. That is, the arm 104 is controlled such that the permanent magnet 105 may assume a position midway between the pair of magnetic pole pieces 110a and 110b of the E-shaped magnetic core 110 disposed opposite the permanent magnet 105. In this case, the idlers 107a and 107b mounted on the both ends of the arm 103 are held out of contact with the inner wall 101 of the turntable B'. When the arm 104 rotates about the shaft 106 in a clockwise or anticlockwise direction due to energization of the coil 118, the idler 107a or 107b of the arm 103 is brought into contact with the inner wall 101 of the turntable B'.

The resiliencies of the springs 113 are selected smaller than the attractive force between the permanent magnet 105 and the magnetic pole pieces 110a and 110b. Since three-speed drive of the turntable requires at least three idlers, another idler support 102' is provided which is the same in construction as the above-described idler support 102, similar components being identified by the similar reference numerals but with prime, To one free end of the first arm 103' of the idler support 102', an idler 107c and a pulley 108c are pivoted concentrically and rotatably. The pulleys 108a, 108b and 108c mounted on the idlers 107a, 107b and 107c have different diameters corresponding to the three speeds for driving the turntable, and these pulleys are all coupled with a common drive shaft 114 of the single motor by the same belt 119. Reference numeral 109 indicates an idler mounted on the other free end of the arm 103'. The idler 109 is fixed to the arm 103' by a pin 117 through a pin hole 117a provided on the idler 109 and a pin hole 117b in the arm 103', which idler serves to stop rotation of the turntable B'. In connection with the idler support 102' there are provided a permanent magnet 105, an E-shaped magnetic core 110', a coil 118', a polarity change-over switch 111A' and a power source 112A' which are exactly the same as those for the idler support 102. The idlers 107c and 109 of the idler support 102' are alternately brought into contact with the inner wall 101 of the turntable B' in the same manner as in the case of the idler support 102.

The following will describe the operation of the turntable driving device constructed as described above. Where the switches 111A and 111A' are both in the off state, the idlers 107a, 107b, 107c and 109 are held out of contact with the inner wall 101 of the turntable B' and hence the turntable B' is not driven. In this case, however, the motor drive shaft 114 is rotated and consequently the idlers 107a, 107b and 107c are revolved, by the respective pulleys 18a, 18b and 18c which are revolved by the drive shaft 114 through the common belt 119. When the switch 111A related to the idler support 102 is turned down to one set of contacts, a current flows in the coil 118 to magnetize the magnetic core 110. In this case, if the current flows in the coil 118 in such a manner that the center magnetic pole piece 110c becomes to be the north magnetic pole, the pair of magnetic poles 110a and 110b opposed to the permanent magnet 105 both become to be the south magnetic pole. Consequently, if the permanent magnet 105 has been magnetized in its widthwise direction as shown in FIGURE 7, the permanent magnet 105 is attracted by the left-hand magnetic pole 110a to rotate the arm 104 in the clockwise direction about the rotary shaft 106. As a result of this, the left-hand idler 107b is brought into driving contact with the inner wall 101 of the turntable B', revolving the turntable B' at a speed depending upon the diameter of the pulley 108b. Turning down the switch 111A to the other set of contact to reverse the direction of the current flowing in the coil 118, the magnetic core 110 is magnetized such that its center magnetic pole piece 110c represents the south magnetic pole and its magnetic pole pieces 110a and 110b represent the north magnetic pole. Accordingly, the arm 104 is turned by the permanent magnet 105 about the shaft 106 in the anticlockwise direction and the right-hand idler 107a is brought into driving contact with the inner wall 101 of the turntable B', with the result that the turntable B is driven at a speed dependent upon the diameter of the pulley 108a. Further, when the switch 111A for the idler support 102 is put in the off state and the switch 111A' for the idler support 102' is put in the on state, the idler support 102' operates in the same manner as in the case of the idler support 102. That is, the idler 107c is pressed against the inner wall 101 of the turntable B' to drive the turntable B' at a speed different from those with the idlers 107a and 107b. Turning down the switch 111A' reversely, the idler 109 fixed to the arm 103 is brought into contact with the inner wall 101 of the turntable B' to stop the rotation of the turntable B'. In this case, the other idlers 107a, 107b and 107c are still rotated by the drive shaft 114 through the belt 119.

FIGURE 9 illustrates another example of this invention as applied to a four-speed driving device, in which the stop idler 109 in the example shown in FIGURE 7 is replaced by a rotatable pulley 108d and an idler 107d formed integrally. That is, the idler 107d corresponds to the idler 109 in FIGURE 7 by removing the pin 117 and the pulley 108d is attached to the idler 109 in FIGURE 7 concentrically therewith. If the idler 107d rotatably mounted on the arm 103' in place of the idler 109 is so adapted as to be fixed to the arm 103 by a pin 117' similar to idler 109 and as to be rotated with the pin 117' removed, if necessary, the three-speed driving can easily be changed to a four-speed one. If the other idlers are also designed to easily be fixed to the arms similar to the idler 109 in FIGURE 7, unnecessary rotation of the idlers can be avoided and the turntable can be stopped more accurately and rapidly. It is a matter of course that the belt is not trained about the pulleys attached to the idlers fixed to the arms.

The example shown in FIGURE 9 is the case where the stop idler 109 in the example shown in FIGURE 7 is replaced by an integrally formed idler and pulley. It is also possible, however, to use the same integrally formed idler and pulley instead of the stop idler 16 in FIGURE 1 for four-speed driving device.

FIGURE 10 illustrates another example of this invention as applied to one-speed driving of the turntable. Similar components to those in FIGURES 7 and 9 are marked with the same reference numerals for the sake of brevity. Reference numeral 109' indicates a stop idler, and 107e and 108e a rotatable idler and a pulley rotatable therewith, which are coupled to a drive shaft 114 through a belt 119. In this case, a permanent magnet 105" is magnetized in its lengthwise direction and a magnetic core 110" having a coil 118" wound thereon and disposed opposite to the permanent magnet 105" is formed in substantially a U-letter configuration. Each end of the coil 118" is connected to each terminal of the DC power source 112A through a switch 111A as in the case in FIGURES 7 and 9. With the device shown in the figure, it is, of course, possible to drive the turntable at two speeds by the idler 107e and the idler 109', where the idler 109' is set free and the belt 119 is also trained around a pulley attached to the free idler 109'.

In the examples illustrated in FIGURES 7 to 10 the operation for engaging a desired idler with the turntable is carried out primarily by the combination of the permanent magnet and the electromagnet, and hence the device is simple in construction and reliable in operation.

In accordance with this invention described above, the turntable is not driven directly by the motor but is driven indirectly through the idler disposed between the turntable and the motor. Therefore, it is not likely that harmful vibration produced in the motor is transmitted directly to the turntable, namely the variations in the revolution of the motor do not effect the rotation of the turntable. Further, since the speed change of the turntable is accomplished by the on-off operation of the switch, there is no need of providing complicated means for moving up and down the idlers or brakes and the belt as in the prior art and consequently the device can be simplified in construction and in operation. In addition, the turntable can be put in its driving condition from its stop condition instantaneously and vice versa.

I claim as my invention:

1. A turntable driving apparatus comprising a turntable, a drive shaft driven by a motor, said drive shaft being disposed within the circle of said turntable, a first support member consisting of a first and a second support arm, said second support arm being attached to said first support arm to intersect said first support arm at substantially the central point thereof and at approximately right angles thereto, said first support member being journalled on a stationary part at the intersecting point of said first and second support arms with the first support arm rotatably supporting at each free end an integral coaxial idler and pulley assembly, a second support member consisting of a first and second support arm attached to an intersecting each other at approximately right angles to each other at substantially the central point of the first support arm, said second support member being journalled on a stationary part at the intersecting point of the respective first and second support arms with the first support arm of said second support member rotatably supporting at one free end an integral coaxial idler and pulley assembly and also supporting at the other free end a brake member, with all idler portions of said idler and pulley assemblies being nearly equal in diameter and the pulley portions thereof being of different diameters, a common belt trained around said drive shaft and all of said pulley portions, and means, provided in connection with the free end of said second support arm of each support member and disposed within the circle of said turntable, electrically activated means connected to said support members to selectively engage one of said idler and pulley assemblies or said brake member with said turntable.

2. A turntable driving apparatus as claimed in claim 1, wherein said means includes biasing means for biasing said first support arm disposed between said first support arm and said stationary part, a pair of springs attached to the free end of said second support arm in parallel relation to each other and an actuator having affixed to the shaft thereof a cam, said cam pressing said springs with its projection, whereby one of said idler and pulley assemblies is selectively engaged with said turntable upon the operation of said actuator.

3. A turntable driving apparatus as claimed in claim 2, wherein said actuator has a pair of coils, a rotary magnet affixed to the shaft of said actuator and return spring means, said pair of coils being arranged in opposite relation so as to rotate said rotary magnet in reverse direction.

4. A turntable driving apparatus as claimed in claim 2, wherein said cam consists of a plate attached to the shaft of said actuator and an arc shaped projection of said plate, both ends of said arc-shaped projection being in contact with the free ends of said spring plates in the inoperative condition.

5. A turntable driving apparatus as claimed in claim 1, wherein said means includes biasing means disposed between said second support arm and said stationary part, a magnetic piece attached to the free end of said second support arm and an electromagnet for attracting said said magnetic piece.

6. A turntable driving apparatus as claimed in claim 5, wherein said magnetic piece is magnetized along the direction substantially perpendicular to the longitudinal direction of said second support arm and said electromagnet is substantially U-shaped and has a coil to which a DC power source is connected through a change-over switch for producing magnetism at both ends of said electromagnet in opposite polarities respectively.

7. A turntable driving apparatus as claimed in claim 5, wherein said magnetic piece is magnetized along the lateral direction of said second support arm and said electromagnet is substantially E-shaped and has a coil wound on the central bar thereof, a DC power source being connected to said coil through a change-over switch for producing magnetism at both free ends of the other bars of said E-shaped electromagnet in opposite polarities respectively.

8. A turntable driving apparatus as claimed in claim 1, wherein said brake is fixed to its support arm by a pin to provide a braking effort when it contact said turntable.

References Cited

FOREIGN PATENTS 559,826 8/1957 Belgium.
690,571 4/1953 Great Britain.

FRED C. MATTERN, Jr., *Primary Examiner.*

J. A. WONG, *Assistant Examiner.*

U.S. Cl. X.R.

74—210, 217